(12) United States Patent
Olshansky et al.

(10) Patent No.: US 12,133,075 B2
(45) Date of Patent: *Oct. 29, 2024

(54) ZONE MIGRATION IN NETWORK ACCESS

(71) Applicant: NOMADIX, INC., Woodland Hills, CA (US)

(72) Inventors: Vadim Olshansky, Tarzana, CA (US); Raffaele Noro, Encino, CA (US)

(73) Assignee: Nomadix, Inc., Woodland Hills, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/396,536

(22) Filed: Aug. 6, 2021

(65) Prior Publication Data

US 2022/0182831 A1    Jun. 9, 2022

Related U.S. Application Data

(63) Continuation of application No. 17/129,503, filed on Dec. 21, 2020, now abandoned, which is a
(Continued)

(51) Int. Cl.
*H04W 12/08* (2021.01)
*G06F 21/30* (2013.01)
(Continued)

(52) U.S. Cl.
CPC ............ *H04W 12/08* (2013.01); *G06F 21/30* (2013.01); *H04L 12/4641* (2013.01);
(Continued)

(58) Field of Classification Search
CPC ....... H04W 12/08; H04W 84/12; G06F 21/30; H04L 12/4641; H04L 63/0209;
(Continued)

(56) References Cited

U.S. PATENT DOCUMENTS 5,185,860 A    2/1993  Wu
5,293,488 A    3/1994  Riley
(Continued)

FOREIGN PATENT DOCUMENTS

CA    2 150 215    11/1996
CA    2 600 760    9/2006
(Continued)

OTHER PUBLICATIONS

Agari et al., "IP Telephony Solution that Extends by Wireless IP Cellular Phone Use", Hitachi Hyoron, Jun. 2007 vol. 89, No. 6, pp. 48-51.
(Continued)

*Primary Examiner* — Kambiz Zand
*Assistant Examiner* — Aubrey H Wyszynski
(74) *Attorney, Agent, or Firm* — Morrison & Foerster LLP

(57) ABSTRACT

The present disclosure is directed to providing a network user the ability to travel between different zones or locations within a network environment, such as, for example, a hospitality location, without requiring a user to re-login to the new location, while requiring a user to re-login to other locations within the network environment.

20 Claims, 7 Drawing Sheets

Related U.S. Application Data continuation of application No. 16/401,894, filed on May 2, 2019, now Pat. No. 10,873,858, which is a continuation of application No. 15/891,167, filed on Feb. 7, 2018, now abandoned, which is a continuation of application No. 14/855,221, filed on Sep. 15, 2015, now Pat. No. 9,894,035, which is a continuation of application No. 14/057,481, filed on Oct. 18, 2013, now Pat. No. 9,141,773, which is a continuation of application No. 13/478,458, filed on May 23, 2012, now Pat. No. 8,566,912, which is a continuation of application No. 12/534,814, filed on Aug. 3, 2009, now abandoned.

(60) Provisional application No. 61/223,667, filed on Jul. 7, 2009.

(51) Int. Cl.
  *H04L 9/40* (2022.01)
  *H04L 12/46* (2006.01)
  *H04W 84/12* (2009.01)

(52) U.S. Cl.
  CPC .......... *H04L 63/0209* (2013.01); *H04L 63/08* (2013.01); *H04L 63/10* (2013.01); *H04L 63/102* (2013.01); *H04L 63/107* (2013.01); *H04W 84/12* (2013.01)

(58) Field of Classification Search
  CPC ....... H04L 63/08; H04L 63/10; H04L 63/102; H04L 63/107
  USPC .......................................................... 370/244
  See application file for complete search history.

(56) References Cited

U.S. PATENT DOCUMENTS

| | | | |
|---|---|---|---|
| 5,623,601 | A | 4/1997 | Vu |
| 5,678,041 | A | 10/1997 | Baker |
| 5,699,520 | A | 12/1997 | Hodgson |
| 5,745,481 | A | 4/1998 | Phillips et al. |
| 5,802,320 | A | 9/1998 | Baehr et al. |
| 5,835,061 | A | 11/1998 | Stewart |
| 5,845,692 | A | 12/1998 | Kellem et al. |
| 5,940,394 | A | 8/1999 | Killian |
| 5,969,678 | A | 10/1999 | Stewart |
| 6,009,475 | A | 12/1999 | Shrader |
| 6,064,674 | A | 5/2000 | Doidge et al. |
| 6,115,545 | A | 9/2000 | Mellquist |
| 6,130,892 | A | 10/2000 | Short et al. |
| 6,141,690 | A | 10/2000 | Weiman |
| 6,147,976 | A | 11/2000 | Shand |
| 6,154,775 | A | 11/2000 | Coss |
| 6,173,322 | B1 | 1/2001 | Hu |
| 6,182,139 | B1 | 1/2001 | Brendel |
| 6,182,141 | B1 | 1/2001 | Blum et al. |
| 6,194,992 | B1 | 2/2001 | Short et al. |
| 6,226,677 | B1 | 5/2001 | Slemmer |
| 6,233,686 | B1 | 5/2001 | Zenchelsky et al. |
| 6,240,533 | B1 | 5/2001 | Slemmer |
| 6,256,307 | B1 | 7/2001 | Salmonson |
| 6,259,405 | B1 | 7/2001 | Stewart |
| 6,326,918 | B1 | 12/2001 | Stewart |
| 6,343,315 | B1 | 1/2002 | Stoel et al. |
| 6,377,990 | B1 | 4/2002 | Slemmer et al. |
| 6,389,462 | B1 | 5/2002 | Cohen |
| 6,414,635 | B1 | 7/2002 | Stewart et al. |
| 6,452,498 | B2 | 9/2002 | Stewart |
| 6,453,353 | B1 | 9/2002 | Win |
| 6,470,027 | B1 | 10/2002 | Birrell |
| 6,470,386 | B1 | 10/2002 | Combar |
| 6,571,221 | B1 | 5/2003 | Stewart |
| 6,574,664 | B1 | 6/2003 | Liu |
| 6,584,505 | B1 | 6/2003 | Howard |
| 6,636,894 | B1 | 10/2003 | Short et al. |
| 6,650,963 | B2 | 11/2003 | DiLorenzo |
| 6,697,018 | B2 | 2/2004 | Stewart |
| 6,732,176 | B1 | 5/2004 | Stewart |
| 6,738,382 | B1 | 5/2004 | West |
| 6,751,677 | B1 | 6/2004 | Ilnicki |
| 6,759,960 | B2 | 7/2004 | Stewart |
| 6,760,416 | B1 | 7/2004 | Banks et al. |
| 6,789,110 | B1 | 9/2004 | Short |
| 6,792,323 | B2 | 9/2004 | Krzyzanowski et al. |
| 6,795,852 | B1 | 9/2004 | Kleinrock et al. |
| 6,810,426 | B2 | 10/2004 | Mysore et al. |
| 6,823,059 | B2 | 11/2004 | Kalmanek |
| 6,834,341 | B1 | 12/2004 | Bahl |
| 6,854,010 | B1 | 2/2005 | Christian et al. |
| 6,856,800 | B1 | 2/2005 | Henry et al. |
| 6,857,009 | B1 | 2/2005 | Ferreria et al. |
| 6,868,399 | B1 | 3/2005 | Short et al. |
| 6,934,754 | B2 | 8/2005 | West et al. |
| 6,950,628 | B1 | 9/2005 | Meier et al. |
| 6,970,927 | B1 | 11/2005 | Stewart |
| 6,996,073 | B2 | 2/2006 | West |
| 7,003,578 | B2 | 2/2006 | Kanada et al. |
| 7,006,440 | B2 | 2/2006 | Agrawal et al. |
| 7,007,080 | B2 | 2/2006 | Wilson |
| 7,009,556 | B2 | 3/2006 | Stewart |
| 7,010,303 | B2 | 3/2006 | Lewis et al. |
| 7,016,960 | B2 | 3/2006 | Howard |
| 7,020,082 | B2 | 3/2006 | Bhagavath et al. |
| 7,032,243 | B2 | 4/2006 | Leerssen et al. |
| 7,058,594 | B2 | 6/2006 | Stewart |
| 7,072,056 | B1 | 7/2006 | Greaves et al. |
| 7,076,544 | B2 | 7/2006 | Katz et al. |
| 7,080,077 | B2 | 7/2006 | Ramamurthy |
| 7,088,727 | B1 | 8/2006 | Short et al. |
| 7,089,586 | B2 | 8/2006 | Kilgore |
| 7,117,526 | B1 | 10/2006 | Short |
| 7,120,678 | B2 | 10/2006 | Greuel |
| 7,123,613 | B1 | 10/2006 | Chawla et al. |
| 7,126,915 | B1 | 10/2006 | Lu |
| 7,194,554 | B1 | 3/2007 | Short et al. |
| 7,197,556 | B1 | 3/2007 | Short et al. |
| 7,216,152 | B2 | 5/2007 | Short et al. |
| 7,240,106 | B2 | 7/2007 | Cochran et al. |
| 7,269,653 | B2 | 9/2007 | Mentze et al. |
| 7,283,803 | B2 | 10/2007 | Karaoguz et al. |
| 7,336,960 | B2 | 2/2008 | Zavalkovsky et al. |
| 7,349,982 | B2 | 3/2008 | Hannum et al. |
| 7,356,841 | B2 | 4/2008 | Wilson et al. |
| 7,376,113 | B2 | 5/2008 | Taylor et al. |
| 7,428,413 | B2 | 9/2008 | Fink |
| 7,472,191 | B2 | 12/2008 | Stewart |
| 7,474,617 | B2 | 1/2009 | Molen et al. |
| 7,493,084 | B2 | 2/2009 | Meier et al. |
| 7,502,841 | B2 | 3/2009 | Small et al. |
| 7,506,368 | B1 | 3/2009 | Kersey et al. |
| 7,526,538 | B2 | 4/2009 | Wilson |
| 7,536,714 | B2 | 5/2009 | Yuan |
| 7,554,995 | B2 | 6/2009 | Short |
| 7,580,376 | B2 | 8/2009 | West |
| 7,689,446 | B2 | 3/2010 | Sagar |
| 7,689,716 | B2 | 3/2010 | Short et al. |
| 7,694,006 | B2 | 4/2010 | Boic et al. |
| 7,698,432 | B2 | 4/2010 | Short et al. |
| 7,702,279 | B2 | 4/2010 | Ko et al. |
| 7,739,383 | B1 | 6/2010 | Short et al. |
| 7,752,334 | B2 | 7/2010 | Paunikar et al. |
| 7,778,193 | B2 | 8/2010 | Mizuno et al. |
| 7,822,873 | B1 | 10/2010 | Paunikar |
| 7,930,721 | B1 | 4/2011 | Hernes |
| 7,953,857 | B2 | 5/2011 | Short et al. |
| 8,027,339 | B2 | 9/2011 | Short et al. |
| 8,051,206 | B2 | 11/2011 | Paunikar et al. |
| 8,056,125 | B2 | 11/2011 | Hirose |
| 8,170,123 | B1 | 5/2012 | Hobgood et al. |
| 8,190,708 | B1 | 5/2012 | Short et al. |
| 8,230,466 | B2 | 7/2012 | Cockrell et al. |
| 8,244,886 | B2 | 8/2012 | Short et al. |

(56) References Cited

U.S. PATENT DOCUMENTS

| | | | |
|---|---|---|---|
| 8,245,276 B1 | 8/2012 | DeRosia et al. | |
| 8,266,266 B2 | 9/2012 | Short et al. | |
| 8,370,879 B2 | 2/2013 | Zerr et al. | |
| 8,370,937 B2 | 2/2013 | Gal et al. | |
| 8,543,665 B2 | 9/2013 | Ansari et al. | |
| 8,566,912 B2 * | 10/2013 | Olshansky | H04L 63/10 709/225 |
| 8,626,922 B2 | 1/2014 | Short et al. | |
| 8,713,641 B1 | 4/2014 | Pagan et al. | |
| 8,782,165 B2 | 7/2014 | Fee et al. | |
| 8,813,138 B2 | 8/2014 | Warrick et al. | |
| 8,856,843 B1 | 10/2014 | Hubach et al. | |
| 8,868,740 B2 | 10/2014 | Pitchaikani et al. | |
| 9,118,578 B2 | 8/2015 | Olshansky | |
| 9,131,266 B2 | 9/2015 | Guedalia et al. | |
| 9,141,773 B2 * | 9/2015 | Olshansky | H04L 12/4641 |
| 9,225,704 B1 | 12/2015 | Johansson et al. | |
| 9,350,815 B2 | 5/2016 | Agarwal et al. | |
| 9,438,567 B1 | 9/2016 | Barraclough et al. | |
| 9,594,846 B2 | 3/2017 | Pinto et al. | |
| 9,654,821 B2 | 5/2017 | Coburn, IV et al. | |
| 9,706,241 B2 | 7/2017 | Felt et al. | |
| 9,716,902 B2 | 7/2017 | Ogle et al. | |
| 9,762,679 B2 | 9/2017 | Gast et al. | |
| 9,769,056 B2 | 9/2017 | Gast et al. | |
| 9,847,888 B2 | 12/2017 | Kannan et al. | |
| 9,894,035 B2 * | 2/2018 | Olshansky | H04L 63/10 |
| 10,873,858 B2 * | 12/2020 | Olshansky | H04L 63/102 |
| 2002/0006788 A1 | 1/2002 | Knutsson et al. | |
| 2002/0083344 A1 | 6/2002 | Vairavan | |
| 2003/0140345 A1 | 7/2003 | Fisk et al. | |
| 2003/0217122 A1 | 11/2003 | Roese et al. | |
| 2004/0006615 A1 | 1/2004 | Jackson | |
| 2004/0015572 A1 | 1/2004 | Kang | |
| 2004/0059815 A1 | 3/2004 | Buckingham et al. | |
| 2004/0203752 A1 | 10/2004 | Wojaczynski et al. | |
| 2004/0244031 A1 | 12/2004 | Martinez | |
| 2005/0143065 A1 | 6/2005 | Pathan et al. | |
| 2005/0148342 A1 | 7/2005 | Sylvain | |
| 2005/0154766 A1 | 7/2005 | Huang et al. | |
| 2005/0154849 A1 | 7/2005 | Watanabe | |
| 2005/0175014 A1 | 8/2005 | Patrick | |
| 2005/0260973 A1 | 11/2005 | van de Groenendaal | |
| 2005/0283791 A1 | 12/2005 | McCarthy et al. | |
| 2006/0031436 A1 | 2/2006 | Sakata et al. | |
| 2006/0089122 A1 | 4/2006 | Zavalkovsky et al. | |
| 2006/0135155 A1 | 6/2006 | Chung et al. | |
| 2007/0073728 A1 | 3/2007 | Klein, Jr. et al. | |
| 2007/0143458 A1 | 6/2007 | Milligan et al. | |
| 2007/0162598 A1 | 7/2007 | Gorodyansky | |
| 2007/0241990 A1 | 10/2007 | Smith et al. | |
| 2007/0271598 A1 | 11/2007 | Chen et al. | |
| 2007/0286100 A1 | 12/2007 | Saaranen et al. | |
| 2008/0209479 A1 | 8/2008 | Zerr et al. | |
| 2008/0263600 A1 | 10/2008 | Olague et al. | |
| 2008/0271109 A1 * | 10/2008 | Singh | H04L 63/102 726/4 |
| 2008/0295012 A1 | 11/2008 | Sloo et al. | |
| 2009/0015723 A1 | 1/2009 | Doumuki | |
| 2009/0027222 A1 | 1/2009 | Larsson et al. | |
| 2009/0064346 A1 | 3/2009 | Larsson et al. | |
| 2009/0113537 A1 | 4/2009 | Woo | |
| 2009/0125609 A1 | 5/2009 | Wood et al. | |
| 2009/0144425 A1 | 6/2009 | Marr et al. | |
| 2009/0228919 A1 | 9/2009 | Zott et al. | |
| 2010/0057501 A1 | 3/2010 | Mohammed | |
| 2010/0082784 A1 | 4/2010 | Rosenblatt et al. | |
| 2010/0153576 A1 | 6/2010 | Wohlert et al. | |
| 2010/0169935 A1 | 7/2010 | Abbruzzese | |
| 2010/0250767 A1 | 9/2010 | Barreto et al. | |
| 2010/0313225 A1 | 12/2010 | Cholas et al. | |
| 2010/0325672 A1 | 12/2010 | Barnett, Jr. et al. | |
| 2010/0332615 A1 | 12/2010 | Short et al. | |
| 2011/0030037 A1 | 2/2011 | Olshansky et al. | |
| 2011/0035466 A1 | 2/2011 | Panigrahi | |
| 2011/0074794 A1 | 3/2011 | Felt et al. | |
| 2011/0083193 A1 | 4/2011 | Howcroft et al. | |
| 2011/0099589 A1 | 4/2011 | Woo et al. | |
| 2011/0138069 A1 | 6/2011 | Momchilov et al. | |
| 2011/0179106 A1 | 7/2011 | Hulse et al. | |
| 2011/0200094 A1 | 8/2011 | Kalra et al. | |
| 2011/0231903 A1 | 9/2011 | Springer | |
| 2011/0296501 A1 | 12/2011 | Drovdahl et al. | |
| 2011/0302607 A1 | 12/2011 | Warrick et al. | |
| 2012/0011033 A1 | 1/2012 | Salgia | |
| 2012/0021684 A1 | 1/2012 | Schultz et al. | |
| 2012/0050012 A1 | 3/2012 | Alsina et al. | |
| 2012/0162351 A1 | 6/2012 | Feldman et al. | |
| 2012/0174163 A1 | 7/2012 | Moorthy et al. | |
| 2012/0239775 A1 | 9/2012 | Hubbard et al. | |
| 2012/0254793 A1 | 10/2012 | Briand et al. | |
| 2012/0324076 A1 | 12/2012 | Zerr et al. | |
| 2012/0324517 A1 | 12/2012 | Ogle et al. | |
| 2013/0024880 A1 | 1/2013 | Moloney-Egnatios et al. | |
| 2013/0055324 A1 | 2/2013 | Ostlund | |
| 2013/0074106 A1 | 3/2013 | Hayashi et al. | |
| 2013/0173694 A1 | 7/2013 | Arsenault | |
| 2013/0174021 A1 | 7/2013 | Buchwald et al. | |
| 2013/0179931 A1 | 7/2013 | Osorio et al. | |
| 2013/0212656 A1 | 8/2013 | Ranade et al. | |
| 2013/0290465 A1 | 10/2013 | Harrison et al. | |
| 2013/0301429 A1 | 11/2013 | Peters et al. | |
| 2013/0318205 A1 | 11/2013 | N et al. | |
| 2013/0347025 A1 | 12/2013 | Prakash et al. | |
| 2014/0053054 A1 | 2/2014 | Shen et al. | |
| 2014/0172946 A1 | 6/2014 | Hershberg et al. | |
| 2014/0258366 A1 | 9/2014 | L'Heureux et al. | |
| 2017/0163724 A1 | 6/2017 | Puri et al. | |
| 2019/0020624 A1 | 1/2019 | Olshansky et al. | |

FOREIGN PATENT DOCUMENTS

| | | | |
|---|---|---|---|
| CA | 2 707 202 | 12/2010 | |
| CA | 2 709 651 | 12/2010 | |
| CA | 2 750 345 | 12/2011 | |
| CA | 2 790 354 | 3/2013 | |
| CA | 2 817 932 | 12/2013 | |
| CN | 1171704 | 1/1998 | |
| CN | 101848211 | 9/2010 | |
| CN | 202488617 | 10/2012 | |
| EP | 0 783 353 | 1/2001 | |
| EP | 1 521 183 | 4/2005 | |
| EP | 2 071 506 | 6/2009 | |
| EP | 2 495 909 | 9/2012 | |
| ES | 2302588 | 7/2008 | |
| JP | 10-105516 | 4/1998 | |
| JP | 11-282804 | 10/1999 | |
| JP | 2007-282103 | 10/2007 | |
| KR | 20040088137 A * | 10/2004 | H04W 12/041 |
| TW | I277352 B * | 3/2007 | H04W 36/02 |
| WO | WO 01/031861 | 5/2001 | |
| WO | WO 01/031885 | 5/2001 | |
| WO | WO 2004/036371 | 4/2004 | |
| WO | WO 2008/108699 | 9/2008 | |
| WO | WO-2010135842 A1 * | 12/2010 | G06Q 20/14 |
| WO | WO 2011/005710 | 1/2011 | |
| WO | WO 2012/032013 | 3/2012 | |
| WO | WO 2012/072105 | 6/2012 | |

OTHER PUBLICATIONS

Maruyama et al., "A Secure LAN Sockets System for Everyone Which Need Not Modify Existing DHCP Clients", Study Report of Information Processing Society of Japan, Jul. 16, 1999, vol. 99, No. 56, pp. 131-136.

Murakami et al., "A Study and Implementation for Rights Management on Electric Documents using Location Information", 2005, p. 50.

Ruckus, "BYOD Webinar Featuring St. Vrain School District," available at https://web.archive.org/save/https://www.youtube.com/watch?v=bGEQKFFc0cw, as accessed Jun. 20, 2017.

(56) References Cited

OTHER PUBLICATIONS

Ruckus, "Dynamic Pre-Shared Key (DPSK)," available at https://web.archive.org/web/20170620220833/https://www.youtube.com/watch?v=tW6_DadBVuo, as accessed Jun. 20, 2017.
Ruckus, "Zero IT," available at https://web.archive.org/web/20170620221535/https://www.youtube.com/watch?v=UsWfGkZ3rhw, as accessed Jun. 20, 2017.
Sakai et al., "Context-Aware Information Provision Based on Context-Handling Platform," The Institute of Electronics, Information and Communication Engineers, Technical Report of IEICE, Nov. 2004, pp. 13-18.
Nakamura et al., "Notes on Spread of Free Public Wireless LAN Systems", National Conference Proceedings Lecture [in Japanese], Mar. 10, 2009, pp. 3-327-3-328.
Case No. CV 09-8441 (C.D. Cal. 2009), *Nomadix, Inc.* v. *Hewlett-Packard Co.*, Complaint for Patent Infringement of U.S. Pat. Nos. 6,130,892; 7,088,727; 7,554,995; 6,636,894; 7,195,554; 6,868,399 and 6,789,110 dated Nov. 17, 2009 in 189 pages.
Case No. CV 10-0381 (C.D. Cal. 2010), *Nomadix, Inc.* v. *Solution Inc. Technologies Ltd.*, Complaint for Patent Infringement of U.S. Pat. Nos. 6,130,892; 7,088,727; 7,554,995; 6,636,894; 7,195,554; 6,868,399 and 6,857,009 dated Jan. 19, 2010 in 163 pages.
Petition for Inter Partes Review of U.S. Pat. No. 8,266,266, *Guest-Tek Interactive Entertainment Ltd.* v. *Nomadix, Inc.* in 65 pages dated Dec. 22, 2017.
Petition for Inter Partes Review of U.S. Pat. No. 8,725,899, *Guest-Tek Interactive Entertainment Ltd.* v. *Nomadix, Inc.* in 62 pages dated Dec. 28, 2017.

\* cited by examiner

Zone Migration Settings

Relogin after migration ☑ Enable ← 403

(Submit) ← 405

Zone-Based Migration

Add a new Zone:

Zone Name: [____] ← 407

Port-Locations: [____] ← 409

(Example: 212-299,301,400-499) ← 411

Description: [____]

Relogin within Zone: ⦿ Disabled ○ Enabled ← 413
                        ← 417

(Add Zone) (Reset)
  ← 415

Existing Zones: ← 419

| Zone Name | Port-Locations | Relogin within Zone | Actions | |
|---|---|---|---|---|
| Guest Wired | 201-700 | Enabled | Edit | Delete |
| Guest Wireless | 801-1500 | Disabled | Edit | Delete |
| Lobby | 100-150 | Disabled | Edit | Delete |
| Meeting Room A | 1601-1700 | Disabled | Edit | Delete |

4 Zones are defined

ZONE MIGRATION IN NETWORK ACCESS

CROSS-REFERENCE TO RELATED APPLICATIONS

The present application is a continuation of U.S. patent application Ser. No. 17/129,503, filed Dec. 21, 2020, which is a continuation of U.S. patent application Ser. No. 16/401,894, filed May 2, 2019, which is a continuation of U.S. patent application Ser. No. 15/891,167, filed Feb. 7, 2018, which is a continuation of U.S. patent application Ser. No. 14/855,221, filed Sep. 15, 2015, which is a continuation of U.S. patent application Ser. No. 14/057,481, filed Oct. 18, 2013, now U.S. Pat. No. 9,141,773, which is a continuation of U.S. patent application Ser. No. 13/478,458, filed May 23, 2012, now U.S. Pat. No. 8,566,912, which is a continuation of U.S. patent application Ser. No. 12/534,814, filed Aug. 3, 2009, which claims the benefit of priority to U.S. Provisional Patent Application No. 61/223,667, filed Jul. 7, 2009. The aforementioned applications are hereby incorporated by reference in their entireties.

FIELD OF THE INVENTION

The present disclosure relates to the field of providing computer network access.

BACKGROUND

The use of laptop, cell phone, PDA and other mobile computing devices has become very common. Travelers, and particularly business travelers, expect and often require network access, such as access to the Internet, as they travel from one place to the next. Similarly, students in schools and doctors in hospitals require access throughout their respective campuses or medical buildings. Even in a single venue, such as a hotel or conference center, travelers and guest desire network access at various locations throughout the venue including guest rooms, restaurants, meeting rooms, lobby, business centers, etc.

SUMMARY

The present disclosure is directed to providing a system for controlling network access in different physical locations of a network. In an embodiment, the disclosure describes a system for controlling access in a network for user moving between different physical locations of the network. For example, in an embodiment, when a user moves between different rooms in a particular venue, the system implements rules which establish when the user will be automatically authenticated to the new location, or whether a new authentication is necessary.

In an embodiment, network access is controlled by implementing different authentication rules for different network access points. A network access point is any wired or wireless connection point to a network. In an embodiment, a network access point is a wired or wireless port. Ports can include, for example, 802.1Q VLAN IDs or the like, TCP ports or the like, UDP ports or the like, and any other software defined communication endpoints. In an embodiment, a network access point is a physical connection to the network, such as, for example, an Ethernet jack, a phone jack, a wireless router, or the like. An access point can also include any form of location identification, such as, for example, the triangulation of a wireless signal, the use of a global positioning system (GPS), or any other system for determining the location of a network user.

In an embodiment, access points are grouped into zones. In an embodiment, a zone includes one or more access points. In an embodiment, a network includes at least a plurality of zones. In an embodiment, a network administrator can configure access rules for allowing a user to move between access points within a zone and/or between zones. In an embodiment, for example, a user is allowed to move from access point to access point within a zone without having to re-authenticate. However, a user may be required to re-authenticate when moving between access points associated with different zones. This can be useful, for example, when a user is required to pay different amounts to access the network through access points in different zones or where different zones have different security levels associated with them. As used in the present specification, authentication can include, for example, a login, including a user name and/or password, the payment of a fee, the registration of a computer, entering a passcode or any other affirmative action taken by a user of a user device to gain permission to use a network.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

The drawings are provided to illustrate embodiments of the inventions described herein and not to limit the scope thereof.

FIG. 4 illustrates an administrator setup screen for defining a plurality of access zones.

DETAILED DESCRIPTION

Figure 1:
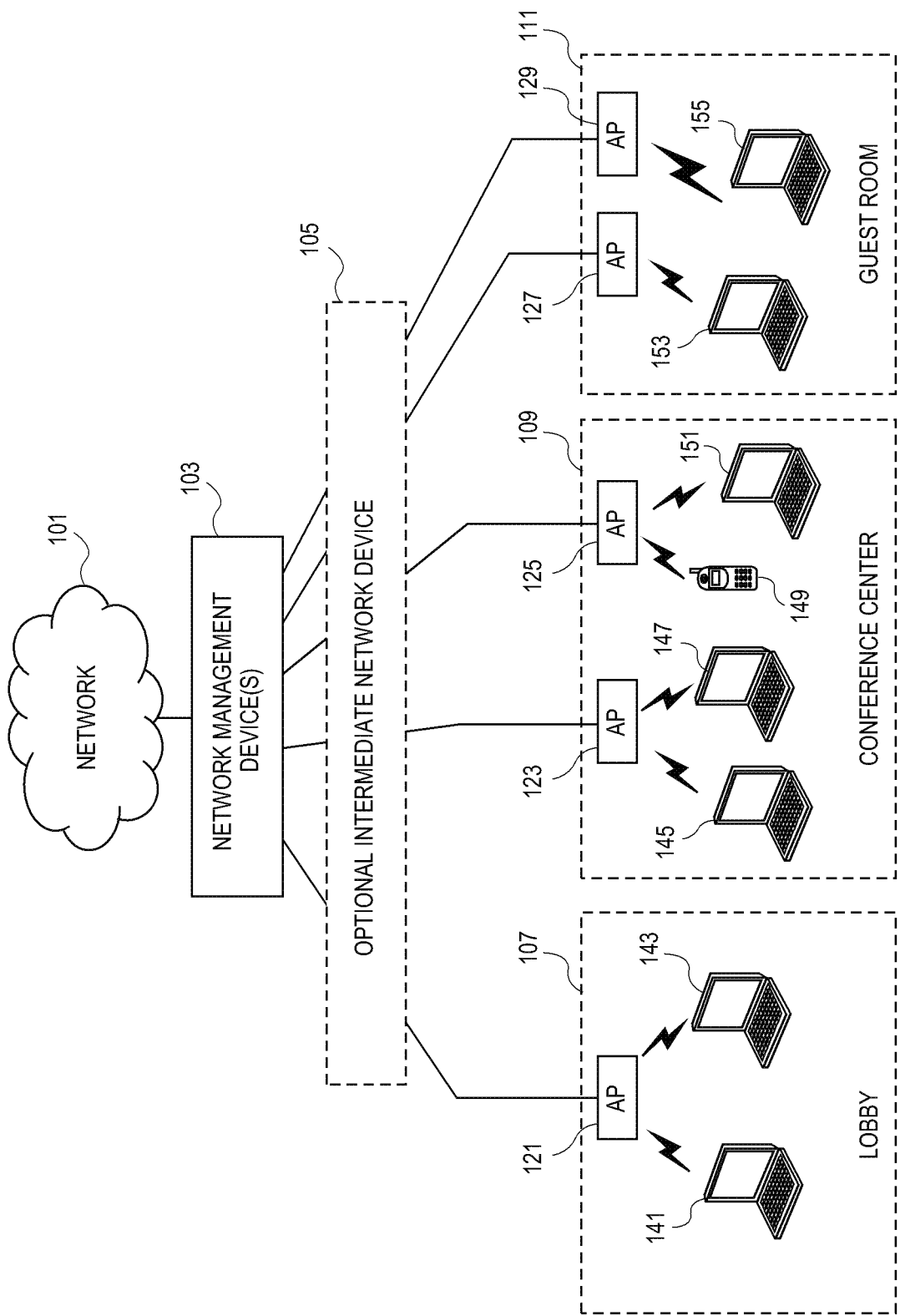
FIG. 1 schematically illustrates an embodiment of a network.

FIG. 1 schematically illustrates an embodiment of a network access system. The system includes various user devices 141, 143, 145, 147, 149, 151, 153, 155. User devices can include, such as, for example, laptops, desktop computers, cell phones, PDAs and any other wired or wireless network enabled communication devices. The user devices 141, 143, 145, 147, 149, 151, 153, 155 communicate with access points 121, 123, 125, 127, 129. Access points 121, 123, 125, 127, 129 provide wired or wireless communications with network management device(s) 103. The network management device(s) 103 controls network communications in-between access points and between the access points and network 101. In an embodiment, the network management device(s) are operated by a single entity. In an embodiment, the network management device(s) create a single network. Optionally, intermediate network devices 105 can also be used, including, for example, routers, switches, hubs, repeaters, etc. to assist in providing communications between access points 121, 123, 125, 127 and network management device(s) 103. The network 101 can be, for example, a public network such as the Internet. Network management device(s) 103 can include network gateways, such as, for example, network access gateways commercially available from Nomadix, Inc. of Newbury Park, CA As will be understood by those of skill in the art from the present disclosure, other network management devices can also be used. As illustrated in FIG. 1, the network includes three different physical areas including lobby 107, conference center 109 and guest room 111. Each physical area includes one or more access points.

The network management device(s) 103 provide the ability to group the access points together for purposes of allowing a user device to move between certain access points without requiring re-authentication while requiring re-authentication when moving to other access points. The grouping of access points can be made, for example, along physical boundaries such as, for example, a wall. This can be done, for example, by allocating certain access points to a defined zone. In an embodiment, a zone is a room, group of rooms, building, group of buildings or the like. For example, the lobby 107 can be a first zone, the conference center 109 can be a second zone and the guest room 111 can be a third zone. In a simple example, a user device will be able to move between access points within a zone without having to re-authenticate, but will be required to re-authenticate when moving between access points located in different zones. Authentication, can include, for example, a login, payment of fees, a request for access, entry of a code, or any other action required by the user to request access to the network. In another example, a user device, once authenticated to the lobby zone 107 can be allowed to access the conference center zone 109 without reauthentication, but may be required to re-authenticate when moving to the guest room zone 111.

In an embodiment, access points advertise their presence by broadcasting a Service Set Identifier (SSID), Extended Service Set Identifier (ESSID), and/or Basic Service Set Identifier (BSSID), or the like, collectively referred to herein as SSID. In an embodiment, the same SSID is assigned to all access points and zones in a network. In an embodiment, a different SSID is assigned to each zone or to a group of zones. In an embodiment, multiple SSID's can be assigned to the same zone or same set of access points. In this respect virtual SSID's can be set up corresponding to different groupings of zones or access points. For example, at the same hotel or conference center, two different conferences which are simultaneously occurring can have custom SSID's corresponding to the access grated to each group. Conference A2 2009 for example can have a custom SSID entitled "Conference A2 2009" which allows access to access points in the Lobby, Guest Rooms and Meeting Rooms without re-authentication, but not in the Business Center. A second conference, Conference B1 2009, can also have a custom SSID entitled "Conference B1 2009" which allows access to the Lobby, Meeting Rooms, Guest Rooms and the Business Center without re-authentication. Similarly, network providers can also have various levels of SSIDs allowing access to different groups of access points where multiple SSIDs correspond to the same access point or zone. Different SSIDs can correspond to different payment levels. For example, an inexpensive SSID access may only grant access to the Lobby, whereas a more expensive SSID can grant access to the Business Center or Meeting Rooms.

In an embodiment, an amount of bandwidth, or maximum bandwidth can be assigned to different access points, groups of access points, zones, groups of zones or custom SSIDs.

The following is a non-limiting example of Zone Migration. As used in this example, a zone is a group of VLAN IDs. When customers connect to the network, for example, at a hotel, they are authenticated in one of four zones:

Lobby/Restaurant/Common Area: 100-150
Guest Wired: 201-700
Guest Wireless: 801-1500
Meeting Room A: 1601-1700

Zone Migration provides the ability to the network to group the VLANS together, meaning that 100-150 would be grouped together, so the user could go from access point 101 in the lobby to access point 125 in the restaurant without being required to re-authenticate. A user would then be required to re-authenticate when moving between the Lobby and Meeting Room A.

Figure 2:
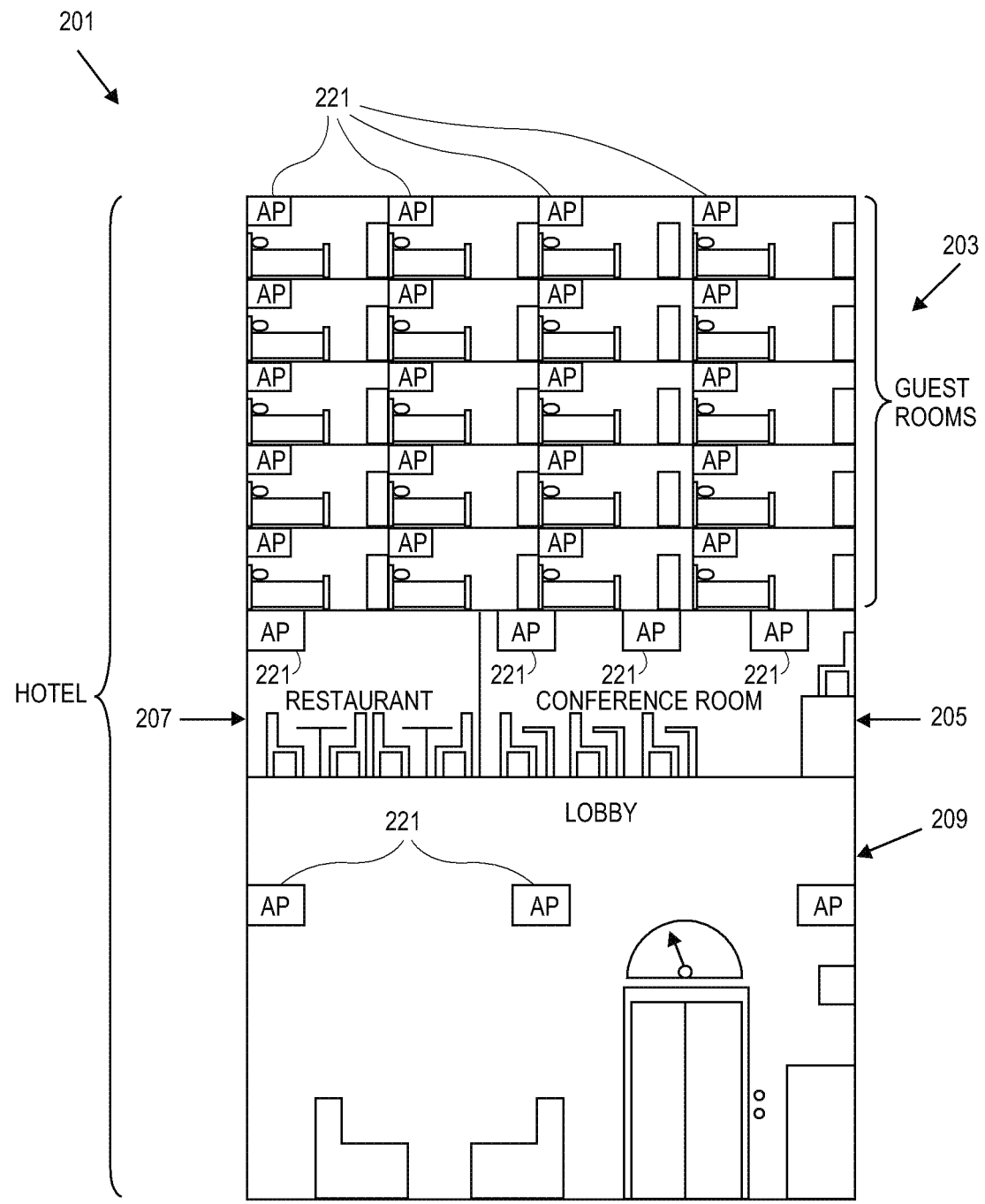
FIG. 2 illustrates a cross section of various access points in a hospitality setting.

FIG. 2 illustrates a cross section of various access points in a hospitality setting. Hotel 201 includes guest rooms 203, conference room 205, restaurant 207 and lobby 209. The guest rooms 203, conference room 205, restaurant 207 and lobby 209 include various access points 221. Although illustrated as having one or more access points in each room, it is to be understood that fewer or more access points can be used. For example, in an embodiment, a single access point can be used for multiple guest rooms. The access points can be configured into various zones. The zones can be defined along room lines or in any other configuration. For example, the access points 221 in the guest rooms 203 area can all be a single zone. Alternatively, access points 221 on a single floor or across less than all floors can also be configured into a zone. As will be understood by a person of skill in the art, zones can be defined along any desired physical locations, incorporating the access points in those physical zones. As will also be understood by those of skill in the art, many different types of facilities will benefit from the present disclosure. For example, although described mainly with respect to hotels, other facilities can use the present access point zone system including schools, colleges, universities, hospitals, government buildings, businesses, or any other public or private networking systems. Also, zones do not need to be restricted to a particular building, but can include multiple buildings.

Figure 3:
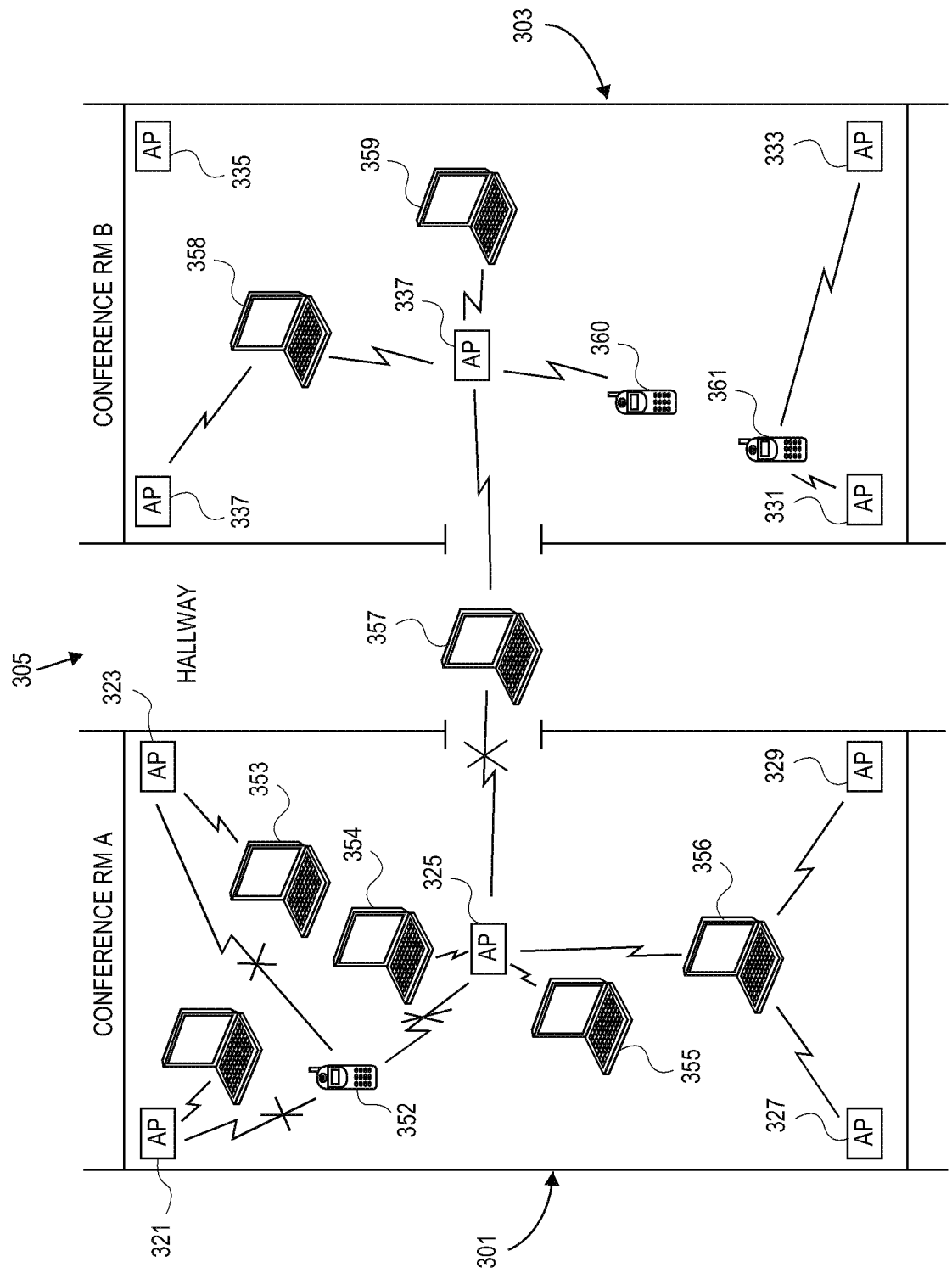
FIG. 3 schematically illustrates access points and network connections of various users in a conference setting.

FIG. 3 schematically illustrates access points and network connections of various users in a conference setting. As illustrated, various user devices, are connected with, attempting to connect with, or are moving between connections with various access points. For example, user device 351 is wirelessly communicating with access point 321. User device 352 is attempting to access the network through access points 321, 323, 325, but has not yet been authenticated and thus is not able to send or receive communications over the network.

Devices are generally programmed to automatically select between access points, by, for example, determining which access point provides the strongest signal. User device 356 is in-between three different access points and is able to communicate with all of them, but will eventually choose one access point to communicate with. In some cases, an access point will not allow a device to communicate through it, in which case the user device will attempt to communicate with another the access point. For example, user device 357 may have the strongest signal with access point 325, but may only be authenticated with access point 337. In this case, the user devices will communicate with access point 337. Of course, as will be understood, user devices can be configured to select access points based on any number of different selection options, including, for example, signal strength, bandwidth availability, access rights, access points corresponding to a particular SSID, etc. When an access point is out of range, a user device will no longer be able to communicate with it and will attempt to find another access point. In an embodiment, switching between access points is seamless, e.g. there is no loss of network session, and a user may not even realize that they have switched access points.

FIG. 4 illustrates an administrator setup screen for defining a plurality of access zones. The setup screen can be an independent computer program or it can run in a web browser. The setup screen provides the ability, as described above, to define zones which include multiple access points (labeled as "Ports-Locations" in FIG. 4). The zone setup information is stored in a database internal or external to the network management device(s) 103 and accessible to the network management device(s) 103. When a user attempts to access the network through an access point, the connection request is sent to the network management device(s) 103 which either allow the access request or deny it based on the programmed information in the database.

A relogin after migration selection 403 is provided to allow an administrator to determine whether to require a user to relogin after migrating between access points. An administrator can enter a zone name as desired in entry area 407. The administrator can then input the ports or locations that correspond to that zone in entry area 409. Optionally, an administrator can provide a description in entry area 411. The administrator can then determine whether a relogin (or reauthentication) will be required for moving between access points within the zone at selection 413. With relogin within zone 413 disabled, a user can freely move between access points without having to relogin. Add zone button 415 provides a subsequent screen which allows an administrator to define another zone. Reset button 417 allows an administrator to reset zone settings. Existing zones section 419 lists all previously defined zones for the network with corresponding ports or locations along with the relogin policy for each zone. To modify an existing zone, the administrator can click on the 'Edit' link of a particular zone. The fields at the top will then be populated with the attributes of the selected zone (name, ports, description and relogin policy). To remove a zone, the administrator can click on the 'Delete' link. A pop-up box will request the confirmation of the delete operation.

In an embodiment, zones cannot overlap, meaning that a port can belong to one and only one zone. In this embodiment, an error will be returned if the administrator enters a new zone that overlaps with an existing zone. In another embodiment, zones can be configured to overlap such that the same port or access location can form part of two or more separate zones.

Many different zone to zone migration policies can be implemented, such as, for example, at the login Portal. In an embodiment, the network can be configured to (1) charge separately for each zone, or (2) allow free migration from "Zone 1" to "Zone 2" after accepting terms and conditions but require a payment when migrating from "Zone 2" to "Zone 1". Similarly, a single payment can be accepted for a group of zones, but an additional or separate charge could be required for other zones.

Zones can also be set up in other interfaces, such as, for example, command line interface (CLI) and simple network management protocol (SNMP). As would be understood by a person of ordinary skill in the art from the present disclosure, the various options and tools available in the interface embodiment of FIG. 4 can be mapped to CLI and SNMP interfaces.

In an embodiment, an unlimited number of zones can be configured. In an embodiment, the number of configurable zones is limited by the capacity of the network equipment used. For example, in an embodiment, up to 64 Zones or up to 32 Zones can be configured.

In an embodiment in which the number of zones is limited, if there is already the maximum number of Zones in the configuration, the network device will return a "Maximum number of Zones already reached" error.

In an embodiment, when a zone is added or modified by the administrator, the network device(s) will check for errors in, such as, for example, the zone name; the specified network access locations, such as, for example, the port assignments;

In an embodiment, the zone name is a string of a specified length, such as, for example, between 1 and 16 characters in length. In an embodiment, if this check fails, the network device(s) will return an "Invalid length of Zone Name" error; the zone description; and/or any other variables.

In an embodiment, the Zone Name must be unique. If this check fails, the network device(s) will return a "Zone Name already in use" error.

In an embodiment, the port name is a string of a specified length, such as, for example, between 1 and 128 characters in length (e.g., enough for at least 20 separate ports, or for at least 10 ranges of ports). The string can contain an individual numeric value (e.g., "211"), or a comma-separated list of numeric values (e.g., "211, 212"), or a range of numeric values with dash-separated delimiters (e.g., "111-799"), or a list of ranges of numeric values (e.g., "100-150, 201-700"), or a comma-separated list of individual numeric values and ranges (e.g., "211, 212, 213-651"). In an embodiment, if the string contains non-numeric values, the NSE will return a "Values may only be numeric, comma separated values or ranges" error.

In an embodiment, the numeric values cannot exceed 65535. When ranges are used, the right delimiter cannot be smaller than the left delimiter. In an embodiment, if these checks fail, the network management device will return an "Invalid format of Ports or value greater than 65535" error.

In an embodiment, ports of different zones cannot overlap. In an embodiment, if this check fails, the network devices will return a "Ports may not overlap ranges in other zones. Modify the overlapping zone first or change this entry" error. In an embodiment, ports are allowed to overlap and this check is not performed.

In an embodiment, the description is a string of specified length, such as, for example, between 0 and 128 characters in length. In an embodiment, if this check fails, the network device(s) will return an "Invalid length of Description" error.

In an embodiment, the relogin is a Boolean value in which no checking is necessary. In some WMI embodiments, the above errors will be shown in a pop-up error box, and in some embodiments, the field causing the error will simultaneously be highlighted with a red border.

There are a number of cases to consider when the zone (e.g. port in some embodiments) of the subscriber changes:

(1) If the "Relogin after migration parameter" is disabled, the subscriber does not need to relogin; (2) If the "Relogin after migration parameter" is enabled, and no zone is specified, the subscriber will need to relogin; (3) If the "Relogin after migration parameter" is enabled, and one or more zones are specified, the subscriber may need to relogin when: (1) the port changes to that of a different zone; or (2) the relogin policy of the zone is to require relogin.

In an embodiment, ports that do not belong to any of the configured zone are automatically assigned to a "default Zone". In an embodiment, the absence of a port is also assigned to a "default Zone". The relogin policy of the "default Zone" is simply derived from the "Relogin after migration" parameter. When the subscriber is re-logged in, and a portal is involved in the relogin process, the zone name will also be sent to the portal along with the other portal parameters (MAC address, room number, etc).

In an embodiment, the Administrator setup page also allows the administrator to set up SSID's corresponding to different zones, groups of zones, access points or groups of access points. In an embodiment, SSID's can be programmed to correspond to overlapping access points or zones. For example, a plurality of SSID's can be assigned to the same access point or zone. The Administrator setup page can also provide for temporary (or permanent) custom SSID's corresponding to a plurality of access points or zones. For example, a conference can be set up with a personalized SSID corresponding to a set of access points or zones.

In an embodiment, the Administrator setup page can also allow an administrator to assign an amount of bandwidth to a particular access point, group of access points, zone, group of zones or SSID. For example, the Lobby may be provided less bandwidth than the Guest Rooms. Similarly, a conference with a custom SSID can be provided a set amount of Bandwidth for users of the custom SSID.

Figure 5:
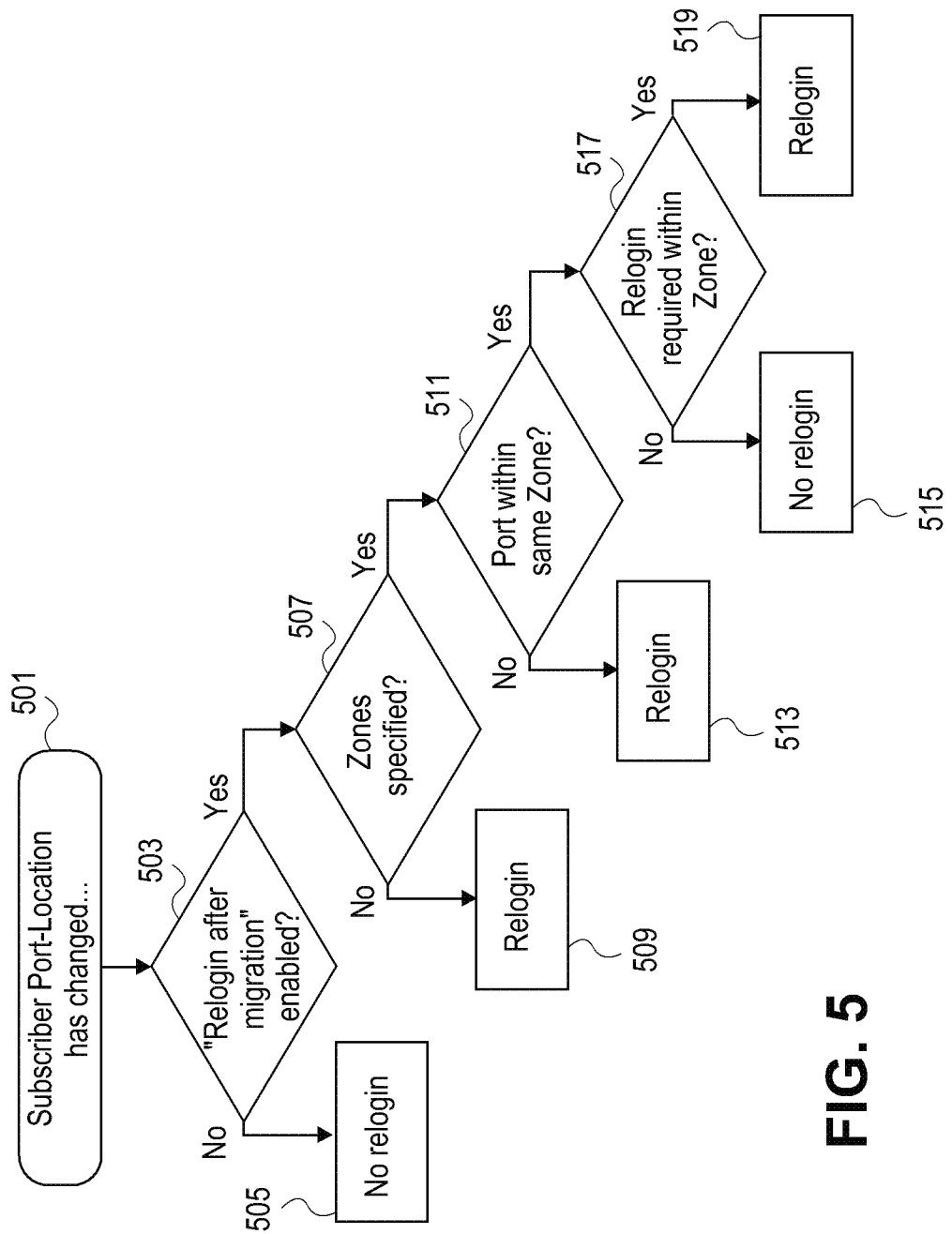
FIG. 5 illustrates a flow chart of a decision tree for determining when a login is required to obtain network access in an embodiment.

FIG. 5 illustrates a flow chart of a decision tree for determining when a login is required to obtain network access in an embodiment. At block 510, a subscriber's access point (labeled as Port-Location) has changed. The system moves to decision block 503 where the system determines whether or not the relogin after migration is enabled. If it is not, then the system allows users to migrate freely between access points at block 505. If the relogin after migration is enabled, then the system moves to decision block 507 where the system determines whether or not zones have been specified. If there are no zones specified then the system will require a relogin at each access point at block 509. If zones have been specified, then the system moves to decision block 511. At decision block 511, the system determines whether the access point, or port in FIG. 5 is within the same zone as the previous access point used by the user. If the answer is no, then a relogin is required at block 513. If the access point is within the same zone, then the system moves to decision block 517. At decision block 517, the system determines whether relogin is required within a zone. If no, then no relogin is required at block 515. If yes, then the user is required to relogin at block 519.

In an embodiment, an administrator can separately define different access rights when moving between zones. For example, in an embodiment, anytime a user moves between zones they are required to login. This type of system is illustrated in FIG. 5. In an embodiment, an administrator can specify that users can move between certain zones without requiring re-authentication while requiring re-authentication when moving to other zones. This type of system is illustrated in FIG. 6.

Figure 6:
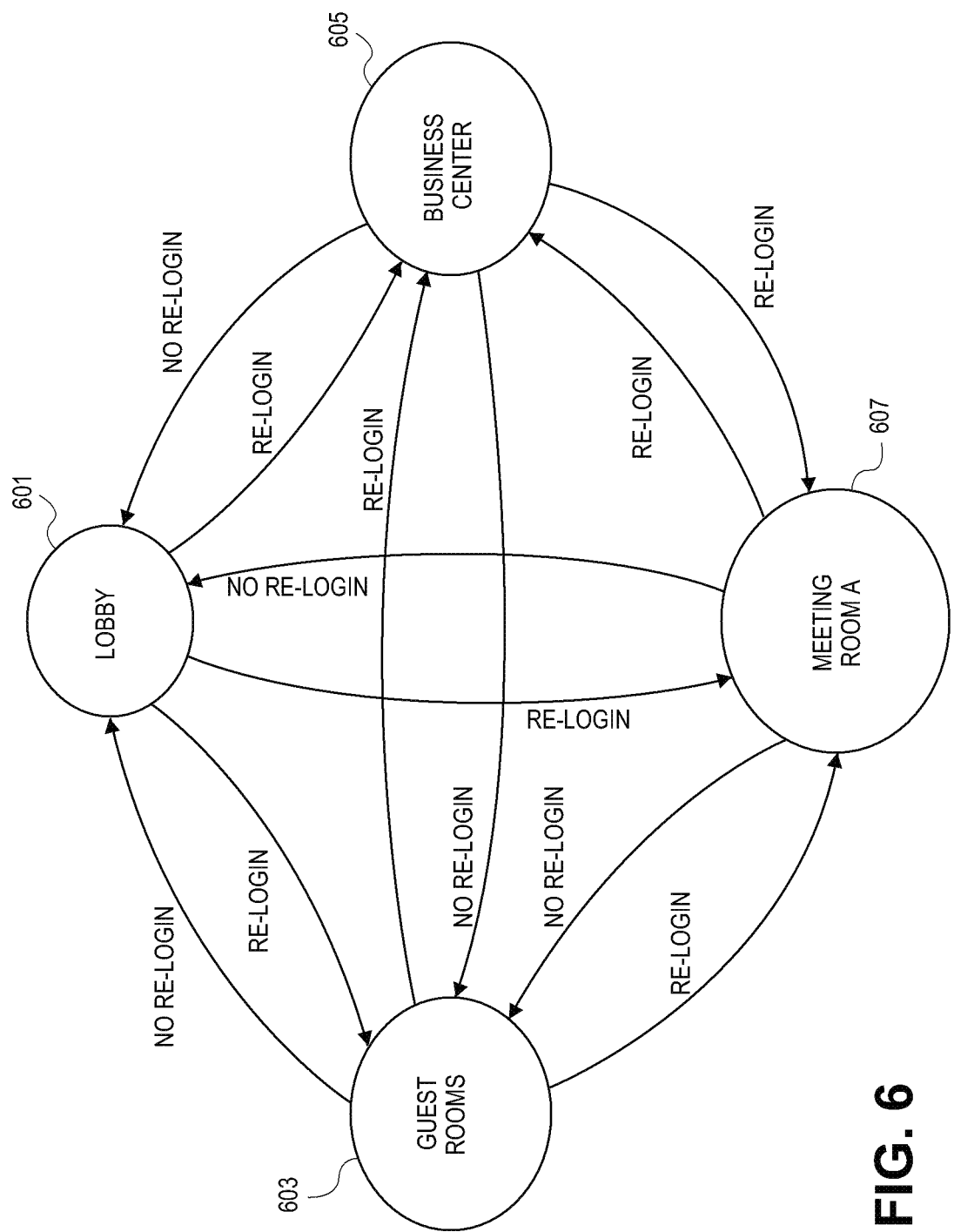
FIG. 6 illustrates a flow chart showing when a login is required when moving between different zones in an embodiment.

FIG. 6 illustrates a flow chart showing when a login is required when moving between different zones in an embodiment. FIG. 6 illustrates four zones, lobby 601, business center 605, guest rooms 603, and meeting room A 607. As illustrated, when a user moves from guest rooms 603 to lobby 601, no relogin is required. When a user moves from lobby 601 to guest rooms 603, a relogin is required. When a user moves between the guest rooms 603 and the business center 605 no relogin is required. When a user moves from the guest rooms to the meeting room A, no relogin is required, but when a user moves from meeting room A to the guest rooms, a relogin is required. When a user moves from meeting room A 607 to the lobby 601, no relogin is required, but when a user moves from the lobby to meeting room A, a relogin is required. When a user moves between the meeting room A and the business center, a relogin is required. When a user moves from the business center 605 to the lobby 601, no relogin is required, but when a user moves from the lobby 601 to the business center 605, a relogin is required. Although FIG. 6 has been described with respect to certain named zones, it is to be understood that any number of zones, zone names, or zone locations can be used with the present system. Also, although described with respect to a relogin, any type of reauthentication can be used to move between zones.

Figure 7:
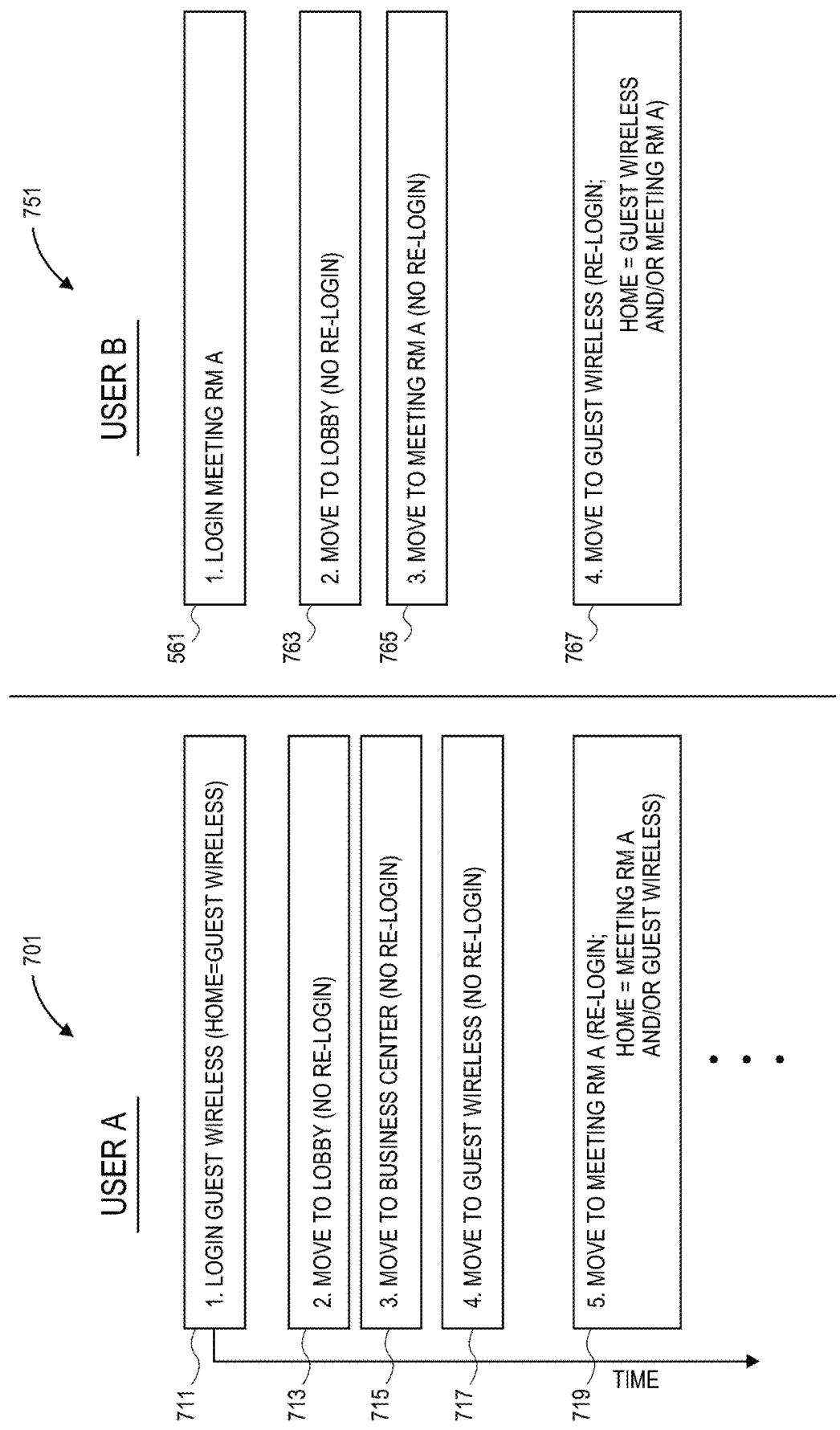
FIG. 7 illustrates a timeline of two examples of users moving between different locations in a network.

In an embodiment, migration between zones can be further configured to use a "home" authentication or initial authentication location to track migration policy. This allows a user, for example, to move from a first zone to a second zone and back to the first zone without a relogin in a system that generally requires a relogin to move from the second zone to the first zone. FIG. 7 illustrates an example timeline of two users moving between different locations in a network which uses a home authentication feature to track migration permission. As illustrated in FIG. 7, User A's 701 initial login is in the guest wireless zone at block 711. The network places into memory User A's initial authentication location and refers back to User A's initial authentication location when to determine migration access rights. User A 701 then moves to the lobby at block 713, then to the business center at block 715 and then back to the guest room at block 717 without relogin. However, when the user moves to meeting room A at block 719, a relogin is required. At this point, the home login can be changed to "meeting room A" or the home login can be both "guest wireless" and "meeting room A" providing permissions to both home authentication permission sets. User B's 751 initial login is the meeting room A at block 761. The user then moves to lobby at block 763 and then back to meeting room A at block 765 without requiring a relogin. However, when the user moves to the guest wireless zone at block 767, a relogin is required. Again, the home login is then altered to either "guest wireless" or both "guest wireless" and "meeting room A."

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein can be embodied in a variety of other forms; furthermore, various omissions, substitutions and changes in the form of the methods and systems described herein can be made without departing from the spirit of the inventions disclosed herein. The claims and their equivalents are intended to cover such forms or modifications as would fall within the scope and spirit of certain of the inventions disclosed herein.

What is claimed is:

1. A network management system comprising one or more hardware processors configured to:
   receive a network access request from a user device at a first network access point;
   in response to receiving the network access request, determine, based on a network access history associated with the user device and permission data associated with the first network access point, that a re-authentication is not required for granting the network access request from the user device; and
   grant the network access request without the re-authentication based on the determination that the re-authentication is not required for granting the network access request from the user device.

2. The network management system of claim 1, wherein the network access history associated with the user device indicates that the user device has moved from a second network access point to the first network access point, and the determination that the re-authentication is not required for granting the network access request from the user device is based on the permission data indicating that the re-authentication is not required for user devices moving to the first network access point from the second network access point.

3. The network management system of claim 1, wherein the network access history associated with the user device indicates that the user device was previously granted network access via a second network access point, and the determination that the re-authentication is not required for granting the network access request from the user device is based on the permission data indicating that the re-authentication is not required for user devices previously granted network access via the second network access point.

4. The network management system of claim 1, wherein the network access history associated with the user device indicates that the user device has moved to the first network access point from another network access point in the same zone as the first network access point, and the determination that the re-authentication is not required for granting the network access request from the user device is based on the permission data indicating that the re-authentication is not required for user devices moving to the first network access point from another network access point in the same zone as the first network access point.

5. The network management system of claim 1, wherein the network access history associated with the user device indicates that the user device has moved to the first network access point from another network access point having an access level higher than that associated with the first network access point, and the determination that the re-authentication is not required for granting the network access request from the user device is based on the permission data indicating that the re-authentication is not required for user devices moving to the first network access point from another network access point having an access level higher than that associated with the first network access point.

6. The network management system of claim 1, wherein the network access history associated with the user device indicates that the user device has moved to the first network access point from another network access point associated with a different service set identifier (SSID) than that associated with the first network access point.

7. The network management system of claim 1, wherein the network access history associated with the user device indicates that the user device was previously authenticated via a second network access point, and the determination that the re-authentication is not required for granting the network access request from the user device is based on the permission data indicating that the re-authentication is not required for user devices previously authenticated via the second network access point.

8. The network management system of claim 1, wherein the permission data comprises a username and a password.

9. The network management system of claim 1, wherein the permission comprises payment authorization.

10. The network management system of claim 1, wherein the first network access point comprises a wireless port.

11. A network management method comprising:
    receiving a network access request from a user device at a first network access point;
    in response to receiving the network access request, determining, based on a network access history associated with the user device and permission data associated with the first network access point, that a re-authentication is not required for granting the network access request from the user device; and
    granting the network access request without the re-authentication based on the determination that the re-authentication is not required for granting the network access request from the user device.

12. The network management method of claim 11, wherein the network access history associated with the user device indicates that the user device has moved from a second network access point to the first network access point, and the determination that the re-authentication is not required for granting the network access request from the user device is based on the permission data indicating that the re-authentication is not required for user devices moving to the first network access point from the second network access point.

13. The network management method of claim 11, wherein the network access history associated with the user device indicates that the user device was previously granted network access via a second network access point, and the determination that the re-authentication is not required for granting the network access request from the user device is based on the permission data indicating that the re-authentication is not required for user devices previously granted network access via the second network access point.

14. The network management method of claim 11, wherein the network access history associated with the user device indicates that the user device has moved to the first network access point from another network access point in the same zone as the first network access point, and the determination that the re-authentication is not required for granting the network access request from the user device is based on the permission data indicating that the re-authentication is not required for user devices moving to the first network access point from another network access point in the same zone as the first network access point.

15. The network management method of claim 11, wherein the network access history associated with the user device indicates that the user device has moved to the first network access point from another network access point having an access level higher than that associated with the first network access point, and the determination that the re-authentication is not required for granting the network access request from the user device is based on the permission data indicating that the re-authentication is not required for user devices moving to the first network access point from another network access point having an access level higher than that associated with the first network access point.

16. The network management method of claim 11, wherein the network access history associated with the user device indicates that the user device has moved to the first network access point from another network access point associated with a different service set identifier (SSID) than that associated with the first network access point.

17. The network management method of claim 11, wherein the network access history associated with the user device indicates that the user device was previously authenticated via a second network access point, and the determination that the re-authentication is not required for granting the network access request from the user device is based on the permission data indicating that the re-authentication is not required for user devices previously authenticated via the second network access point.

18. The network management method of claim 11, wherein the permission data comprises a username and a password.

19. The network management method of claim 11, wherein the permission data comprises payment authorization.

20. The network management method of claim 11, wherein the first network access point comprises a wireless port.

* * * * *